Figure 10:
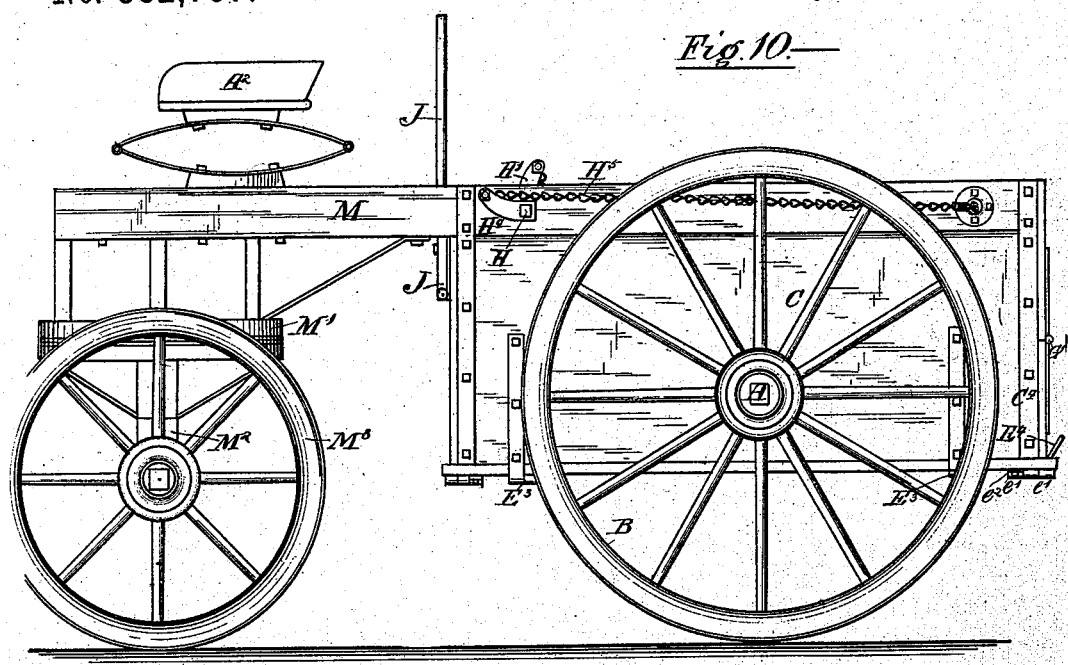

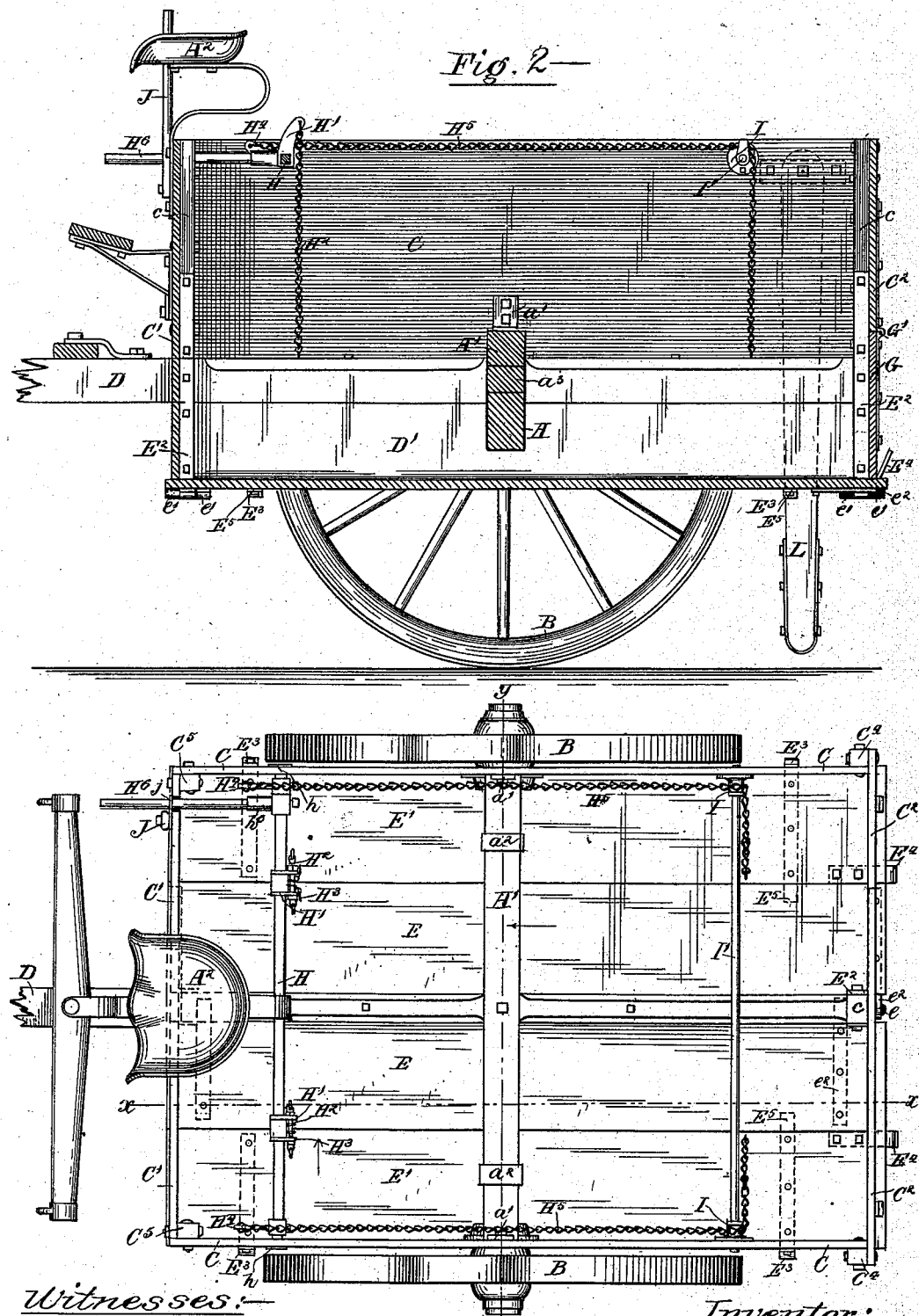

(No Model.) 4 Sheets—Sheet 2.
A. M. WOOLFOLK.
DUMPING WAGON.
No. 382,787. Patented May 15, 1888.
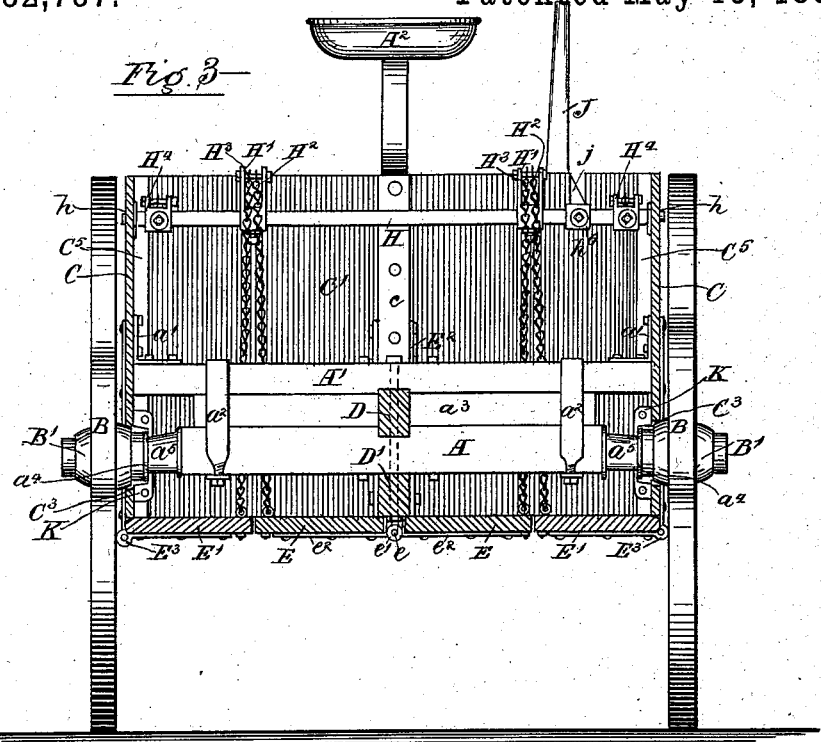
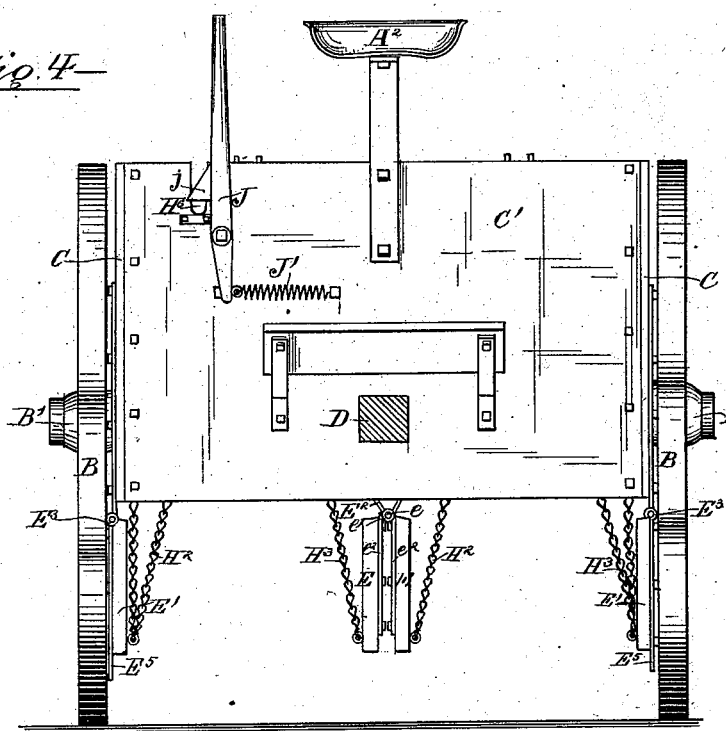
Witnesses:
Saml B. Dover
Wm F. Henning
Inventor:
Alexander M. Woolfolk
by Dayton & Poole Attorneys (No Model.)  4 Sheets—Sheet 3.
A. M. WOOLFOLK.
DUMPING WAGON.
No. 382,787.  Patented May 15, 1888.
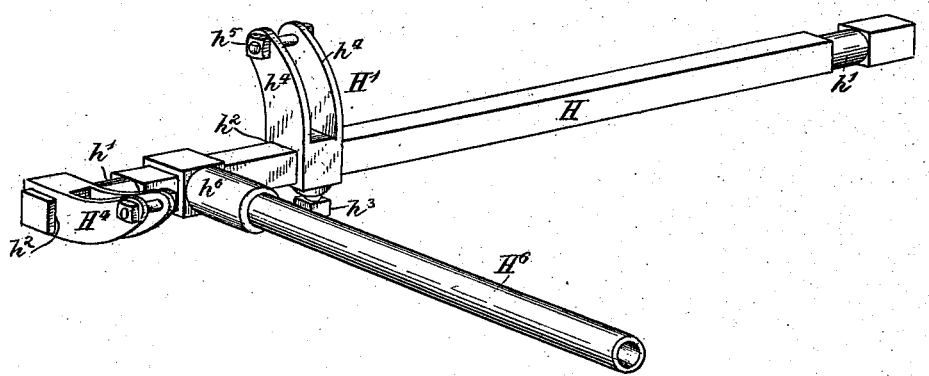
Fig. 7.
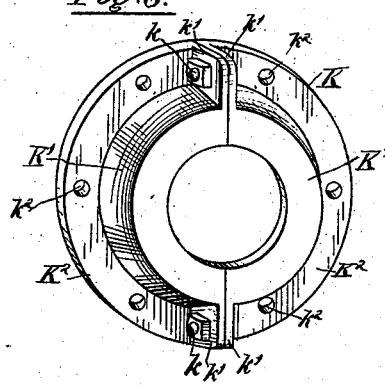
Fig. 8.
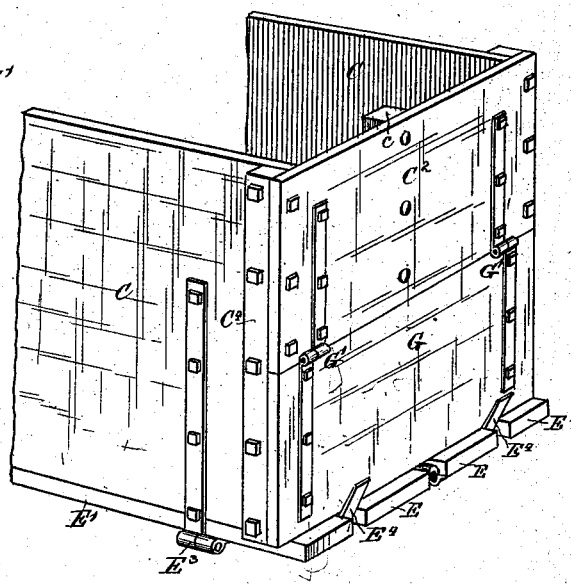
Fig. 5.
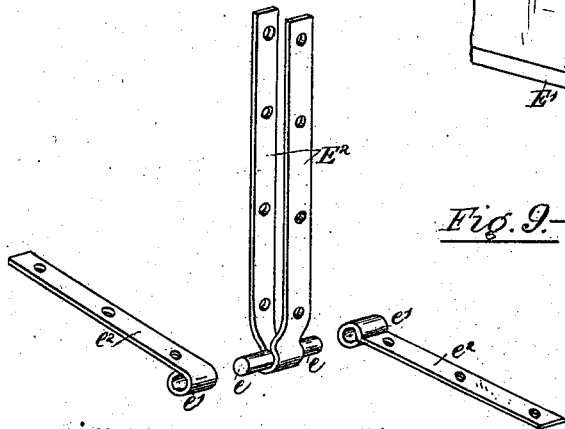
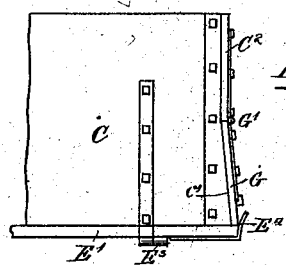
Fig. 9.  Fig. 6.
Witnesses:
Saml. B. Dover
Wm. F. Henning
Inventor:
Alexander M. Woolfolk
by Dayton & Poole, Attorneys (No Model.) 4 Sheets—Sheet 4.

A. M. WOOLFOLK.
DUMPING WAGON.

No. 382,787. Patented May 15, 1888.

Witnesses:
Sam'l B. Dover.
Wm. F. Heming.

Inventor:
Alexander M. Woolfolk.
by Dayton & Poole. Attorneys.

UNITED STATES PATENT OFFICE.

ALEXANDER M. WOOLFOLK, OF CHICAGO, ILLINOIS.

DUMPING-WAGON.

SPECIFICATION forming part of Letters Patent No. 382,787, dated May 15, 1888.

Application filed September 14, 1887. Serial No. 249,643. (No model.)

*To all whom it may concern:*

Be it known that I, ALEXANDER M. WOOLFOLK, of Chicago, in the county of Cook and State of Illinois, have invented certain new and useful Improvements in Dump Carts or Wagons; and I do hereby declare that the following is a full, clear, and exact description thereof, reference being had to the accompanying drawings, and to the letters of reference marked thereon, which form a part of this specification.

This invention relates to a novel dump cart or wagon of that class in which the body of the cart or wagon is provided in its lower part with a plurality of hinged flaps adapted to swing downwardly to open the bottom of the body and allow the escape of the contents thereof, combined with means for raising and securing the said flaps.

The invention consists in the matters hereinafter described, and pointed out in the appended claims.

In the dump cart or wagon herein shown as embodying the main features of my invention the body thereof is provided with a central longitudinal beam extending from the front to the rear of the body, and the bottom or lower portion of the latter is formed by four hinged flaps, two of which are pivotally connected with the central longitudinal beam and the other two of which are pivoted to the lower margins of the side walls of the body. For elevating and holding closed the said flaps the body is provided near its front end with a transversely-arranged rock-shaft provided with rigid arms, to which are connected chains passing from the ends of said arms to the free edges of the flaps, a suitable locking device being provided for holding the rock-shaft from backward movement when the flaps are raised or closed. In a wagon-bed thus constructed the horizontal beam above referred to divides the body into two parts or divisions, the bottom of each of which is formed by two of the hinged flaps. When such flaps are released and allowed to fall, those hinged at the middle of the wagon hang vertically adjacent to each other, while the outer flaps hinged to the sides of the bed hang vertically beneath the said sides, so that the earth or other material within the bed is discharged therefrom in two parts divided by the central beam and flaps. To facilitate the discharge of the earth, the rear end of the wagon or cart body herein illustrated is provided with a tail-board hinged at its upper edge, so that after the earth is deposited upon the ground said tail-board may ride over the same to allow the cart or wagon to readily pass over or from the pile of dumped material.

The dump cart or wagon herein shown also embraces other features of novelty, as hereinafter set forth, and pointed out in the appended claims.

The invention may be more readily understood by reference to the accompanying drawings, in which—

Figure 11:
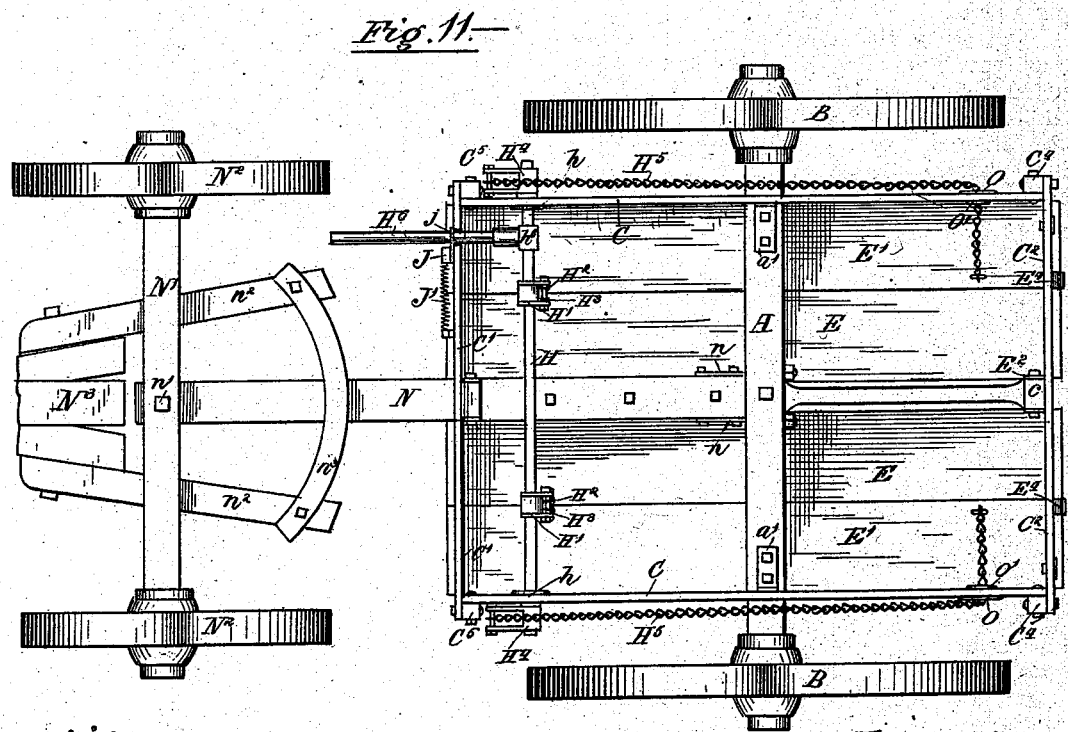

Figure 1 is a plan view of a dump-cart embodying the main features of my invention. Fig. 2 is a longitudinal vertical section of the same, taken upon line *x x* of Fig. 1. Fig. 3 is a cross-sectional view of the dump-cart shown in Figs. 1 and 2, taken upon line *y y* of Fig. 1, looking toward the front of the cart. Fig. 4 is a front elevation of the cart shown in Figs. 1, 2, and 3, illustrating the bottom flaps as open, or in the position occupied by them after the cart is dumped. Fig. 5 is a perspective view of the rear end of the dump-cart shown in Figs. 1 and 2, illustrating more clearly the hinged tail-board thereof. Fig. 6 is a fragmentary side elevation of the rear part of the dump-cart, showing a modified construction in the hinged tail-board and parts adjacent thereto. Fig. 7 is a perspective view, detached from the body of the cart or wagon, of the rock-shaft for elevating the flaps. Fig. 8 is a perspective view, detached from the other parts, of a metal shell or thimble shown in Figs. 1, 2, and 3 as secured to the sides of the cart-body and extending about the axle. Fig. 9 is a detail perspective view illustrating a novel construction in the hinges or pivotal connection uniting the inner flaps with the longitudinal beam of the wagon or cart body. Fig. 10 is a side elevation of a dump-wagon constructed to rest at its front end upon a front axle. Fig. 11 shows a plan of a dump-wagon generally similar to that shown in Figs. 1, 2, and 3, in which the tongue is attached to the front axle by a king-bolt.

As illustrated in the accompanying drawings, (Figs. 1 to 9,) A is the cart-axle, provided with wheels B B, and C C are the side walls, C' the front wall, and C² the rear wall, of the cart-body.

D is a tongue or pole to which the horses are connected and which extends rearwardly through the front wall of the wagon-body over the axle A to the rear end thereof.

D' is a longitudinal beam secured to the axle and to the tongue D beneath the latter and extending from end to end of the body.

E E E' E' are four hinged flaps forming the bottom of the wagon-body. The flaps E E are hinged or pivoted beneath the longitudinal beam D'. The flaps E' E' are hinged or pivoted to the lower margins of the side walls, C C, of the wagon-body. The hinged connections between the said flaps and the wagon-body are, in the particular construction shown, made as follows:

$E^2 E^2$ (Figs. 1, 2, 3, and 9) are U-shaped metal straps, which are arranged vertically at opposite sides of the tongue D, and beam D' and secured thereto by bolts, as shown. These straps are secured at their lower ends to a pivot-pin, $e$, which projects at both ends therefrom, so as to engage the eyes $e'$ $e'$ upon the ends of the straps or bars $e^2$ $e^2$, secured to the flaps E E. The said straps $E^2$ $E^2$ are herein shown as employed to connect the beam D' and tongue D with the front and rear walls of the body, said straps $E^2$ being for this purpose extended considerably above the top of the tongue D, and being bolted to vertical wooden bars $c$ $c$, which are in turn bolted to the front wall, C', and rear wall, C², of said body. The outer flaps, E', are connected with the sides C C of the body by common strap-hinges $E^3$ $E^3$, secured to the end surface of the flaps and the outer surface of said side walls.

A' is a cross-bar located above and parallel with the axle A, and secured at its ends to the sides C C by means of angle-irons $a'$ $a'$. Said bar A' is shown as secured to the axle-clips $a^2$ $a^2$, filling pieces $a^3$ $a^3$ being placed between the said bar A' and the axle.

G is a hinged tail-board forming the lower part of the rear wall of the wagon-body and hinged at its upper edge to the stationary part C² thereof. As shown in the drawings, the hinged connection between said tail-board G and the stationary part C² is formed by ordinary strap-hinges G' G'. Means is provided for holding the said tail-board closed, consisting of fingers $E^4$ $E^4$, attached to the rear ends of the flaps E' E', and constructed to extend outside of and engage the lower margin of the tail-board when the said flaps E' E' are closed. The employment of the said prongs $E^4$ $E^4$ enables any other securing devices for the tail-board to be dispensed with, while at the same time it provides an automatic locking device for the tail-board, which will securely hold closed the said tail-board and will automatically release the latter when the flaps E E E' E' are dropped for dumping the load. The prongs $E^4$ $E^4$ may be made in any desired or preferred manner; but, as herein shown, they are formed by angle-irons secured to the lower surface of the flaps E' E' and bent upwardly at the rear edge of said flaps in position to properly engage the tail-board. Said prongs or fingers $E^4$ are preferably outwardly inclined in their parts which come in contact with the tail-board, so that as the flaps are lifted the free edge of the tail-board will be forced inwardly and the tail-board thereby tightly closed.

In Fig. 6 I have shown a slight modification of the construction of the parts adjacent to the tail-board. In this case the lower marginal part, $c'$, of the side wall, C, of the wagon-body, against which the tail-board bears, is made oblique and is inclined rearwardly and downwardly from the pivotal point of the tail-board, while the flaps E' E' are extended sufficiently to come beneath the lower edge of the tail-board when the latter is supported in an inclined position by contact with the said inclined edges of the side walls. The object of constructing the parts in this manner is to facilitate the closing of the tail-board by gravity, it being entirely obvious that the said tail-board will come in bearing against the inclined lower parts of the side walls with much more certainty when the said parts are made oblique, in the manner described, than when the tail-board is vertical, as shown in Fig. 5. The advantage of this latter construction is especially obvious in case the wagon is tipped or standing upon inclined ground at the time it is desired to close the tail-board and flaps, it being entirely obvious that with the construction shown in Fig. 5 the tail-board will not close at all in case the wagon were tipped backwardly or resting upon ground sloping toward the rear of the wagon, while in case the construction is used which is shown in Fig. 6 the tail-board will close by gravity, notwithstanding a considerable inclination of the wagon-body.

The devices illustrated in Figs. 1 to 7 for lifting and holding closed the several flaps E E E' E' are constructed as follows:

H is a transversely-arranged rock-shaft having bearings $h$ $h$ in the upper parts of the side walls, C C, of the cart-body. Said rock-shaft is provided with two rigid arms, H' H', the outer ends of which are connected by means of chains $H^2$ $H^3$ with the free edges of the flaps E' E' at points near the front ends of said flaps and vertically beneath the rock-shaft. Said rock-shaft is provided also with two rigid arms, $H^4$ $H^4$, arranged at right angles with the arms H' H', the extremities of said arms $H^4$ $H^4$ being connected by chains $H^5$ $H^5$ with the free edges of the rear parts of the outer flaps, E' E'. Guide-rollers I I for the chains $H^5$ $H^5$ are arranged upon the rear part of the cart-body, and said chains pass vertically upward from their points of attachment to the flaps E' E' and over said guide-rollers I I, and then horizontally forward to their points of connection with the arms $H^4$ $H^4$ of the rock-shaft. In the particular construction shown the guide-rollers I I are mounted upon a horizontal rod, I', which is secured at its opposite ends in the side walls, C C, of the cart-body.

H⁶ is an actuating-lever secured to the rock-shaft H in position convenient to be reached by the driver sitting in a seat, A². The parts are so arranged that when the hand-lever H⁶ is vertical the arms H' H' will be horizontal and the arms H⁴ H⁴ vertical. By swinging the said hand-lever downwardly and forwardly to a horizontal position, as shown in Fig. 2, the free ends of the arms H' will be carried upwardly, so as to draw upwardly upon the chains H² H³, and thereby lift the free ends of the flaps to close the latter. At the same time the arms H⁴ H⁴ of the rock-lever will be carried forwardly and downwardly, thereby drawing the horizontal part of the chain H⁵ forward and causing its rear portion to be drawn upward to lift the free edge of the flaps E' E'.

It will of course be understood that rods may be substituted for the chains H² H³ and for the portions of the chains H⁵ H⁵ which do not engage the guides upon the wagon-body.

It will be observed that in the construction described no connection is made between the rear ends of the flaps E E and the rock-shaft for raising the said rear ends of said flaps. In place of such connection, however, I place upon the rear margins of the outer flaps, E', projecting parts or fingers E⁵ E⁵, which are adapted to extend beneath and engage the margins of the flaps E E as the edges of the flaps come together in closing them. Said fingers E⁵ E⁵ thus not only serve to aid in lifting the free edges of the flaps E E at the rear parts of the latter, but operate to rigidly sustain the rear parts of said flaps when the several flaps are closed. The fingers E⁵ E⁵ are shown in the drawings as formed by the ends of the straps of the hinges E³ E³.

For engaging the hand-lever H⁶ so as to hold the latter in a horizontal position and the rock-shaft from turning backwardly after the flaps have been lifted and closed, a hand-lever, J, is pivoted to the front wall, C', of the cart-body, and is provided with a projecting part or tooth, j, adapted to extend over and engage the said lever H⁶, a spring, J', being preferably connected with the said lever J in such position as to hold the tooth j normally in position to engage the hand-lever. In the use of a locking device thus made the rock-shaft may be released for dumping the wagon by pulling the hand-lever J away from the actuating-lever H⁶ until the tooth j is disengaged from said actuating-lever. Said tooth j is preferably beveled upon its upper surface, so that when the actuating-lever H⁶ is depressed it will, upon encountering said tooth, throw the hand-lever laterally until it passes the tooth, after which the spring J' will throw the projection into the path of the actuating-lever, and thus prevent the backward movement of the latter.

As a simple and cheap construction in the rock-shaft H and connected parts, I make the said rock-shaft of square iron and turn a cylindric bearing-surface, h', near each end thereof, to engage the bearings h h. The arms H' H⁴ are desirably cast with rectangular apertures h² h², through which the square bar composing the rock-shaft H may be inserted, said arms being provided with set-screws h³ for clamping the arm in place upon the rock-shaft. Each of the arms H' preferably consists of two parallel parts or plates, h⁴ h⁴, cast integral with each other, and provided at their outer ends with apertures to receive a bolt or pin, h⁵, Fig. 7, to which the chains H² H³ are attached. The hand-lever H⁶ preferably consists of a pipe or tube connected with a square bar composing the rock-shaft by means of a cast-metal head, h⁶.

It is obviously desirable that a dump cart or wagon employed in removing earth from cuts or excavations should be as narrow as possible in order that it may occupy little space in turning, and may run close to the side walls of the excavated space. I have herein shown a device enabling the wheel to be set close to the cart-body in a cart of the kind described, which is made as follows: The sides C C of the said cart-body are, as clearly shown in Fig. 3, provided at the points at which the axle passes through the said side walls with apertures C³ C³ of proper size to admit the hubs B' B', the axle-collars a⁴ a⁴, against which the said hubs bear, being located at a considerable distance inwardly from the inner face of the said side walls.

K is an annular metal shell or thimble, which is secured to each side wall of the wagon against the inner face of the latter and around the margins of the apertures C³. Said shell or thimble is constructed to fit closely at its inner edge against the end portion of the axle A, adjacent to and inside of the axle-collar, and serves to close the space through which earth would otherwise pass, and to form a recess in the exterior face of the side of the wagon, within which the said wheel-hub is located. The particular axle shown is provided with conical metal skeins a⁵ a⁵, extending a considerable distance inwardly past the axle-collars a⁴ a⁴, and the shells or thimbles K K are made circular upon their inner margins to closely fit the said skeins. In axles of other forms, however, the thimble will be fitted closely thereto, whatever may be the cross-sectional shape of the axle in the part adjacent to the axle-collar.

For convenience of construction and attachment, the thimble K is herein shown, Fig. 8, as constructed of two halves or pieces, K' K', secured together by bolts k k, which pass through lugs or flanges k' k' upon the meeting ends of each half K', this construction obviously enabling the sleeves or collars to be conveniently placed over the axle in placing the parts together. For securing the thimble to the side wall of the body said thimble is desirably provided with flanges K² K², having holes k² for bolts or rivets.

Inasmuch as in a cart or wagon body constructed in the manner described, in which the entire weight of the exterior flaps, E' E', comes upon the side walls, C C, it is desirable that a rigid and strong connection should be provided between said side walls and the wheel-axle. The metal shells or thimbles K K may be made of sufficient size and strength to afford ample support for the said side walls of the body; but the employment of the cross-beam A', secured at its ends to the said side walls in the manner clearly shown in Fig. 3, and above described, is of advantage in connection with a wagon-body supported from the axle in the manner illustrated, for the reason that it gives a separate point of support for the side wall, and at the same time gives a rigid lateral connection between the opposite walls independent of the connection afforded by the engagement of the shells K K with the axle.

A preferred means of connecting the side and end walls of the cart body is shown in Figs. 1, 2, and 5, wherein the said end walls are bolted at their ends to upright pieces $C^4$ $C^4$, located exterior to the side walls and forward of the rear wall, $C^2$, thereby giving smooth corners at the rear of the body, as more clearly shown in Fig. 1, while at the same time affording a very strong means of attaching the said walls to each other. The sides and end walls at the front of the bed, may be attached in a similar manner, and a construction of this kind is illustrated in Figs. 10 and 11, but, as shown at the forward end of the body, illustrated in Fig. 1, upright pieces $C^5$ $C^5$ are located inside of the corner of the body.

In Fig. 2 I have shown an upright bar, L, pivoted at its upper end to the side of the wagon-bed, so as to swing freely in a vertical plane parallel with the side of the bed, the lower end of the said bar being terminated at a point near the ground. Two of these bars may be employed, one at each side of the wagon, and their purpose is to sustain the weight of the rear part of the wagon and prevent the body from tipping rearwardly in case of a preponderance of weight in the rear part of said body.

The body of the wagon illustrated in Fig. 10 is generally similar to that of the cart shown in Figs. 1, 2, 3, and 4, and is lettered in the drawings in the same manner. In this instance, however, a longitudinal beam, M, is secured to the upper margin of each side wall of the body and extends a considerable distance forward from the latter, and the beams at each side of the wagon are attached at their forward ends to a fifth-wheel, M', which is sustained upon a front axle, $M^2$, provided with wheels $M^3$. The wagon-body shown in Fig. 11 is also generally like that shown in Figs. 1, 2, 3, and 4; but in said Fig. 11 a beam, N, is extended into the body and attached to the axle A in the same manner as is the tongue or pole D. (Shown in Figs. 1, 2, 3, and 4.) In this instance, however, the beam N is shown as terminating at the axle and as being secured thereto by strap-bolts $n$ $n$, instead of extending over the axle and to the rear end of the body, as does the pole shown in said figures. The beam N is united by a king-bolt, $n'$, to an axle, N', provided with wheels $N^2$ $N^2$ and with hounds $n^2$ $n^2$ and a sway-bar, $n^3$. Attached to the hounds $n^2$ is the usual tongue, $N^3$. The forward part of the gear is thus made like that of an ordinary farm or lumber wagon and operates in the same manner.

In Figs. 10 and 11 I have shown a slight modification of the devices for lifting the flaps E' E', the chains $H^5$ $H^5$, which extend to the rear end of said flaps, being shown in said figures as located outside of the side walls of the body and as arranged to pass through guide-apertures O in the rear portions of the said side walls. When the chains are thus located, the arms $H^4$ $H^4$ upon the rock-shaft H will be located outside of the said side walls, C, as clearly shown in said Figs. 10 and 11. The apertures O O are shown as provided with metal guide-rings or bushings O'.

I am aware that the employment of longitudinally-arranged bottom flaps in a dump-wagon is old, and I am also aware that a dump-cart has been constructed in which the cast body is suspended beneath an axle passing transversely over it, and in which the body is provided in its bottom with narrow transverse flaps parallel with the axle. I am also aware of the patent to Geer and Palmer, granted January 9, 1866, in which is shown a wagon-bed containing a transverse axle at its bottom, longitudinally-arranged flaps filling the space in front of the axle, and a transverse flap closing that part of the body at the rear of the axle.

A device embodying my invention differs from those above referred to in having an axle which passes through the sides of the wagon-body, above the bottom of the same, and longitudinally-arranged flaps extending from end to end of the body below and free from said axles; and my invention is therefore limited to a construction embracing these particular features. The novel construction herein shown, and above referred to, has the great advantage of enabling wide flaps to be employed extending from end to end of the wagon, it being entirely obvious that if the axle were below the flaps the latter must necessarily be made narrow and numerous, while if on a level with the flaps the division of the same into two sections becomes necessary, as illustrated in the patent to Geer and Palmer, hereinbefore referred to. In the employment of transverse flaps such flaps must necessarily be very narrow or supported to turn about pivotal axes located intermediate to their side edges, in order to prevent the lower edges of the flaps coming too near the ground when the wagon is dumped, it being entirely obvious that ample space must be left beneath the wagon-body for the dumped material, in order to allow the flaps to pass over such material without injury to the said flaps after the discharge of the load. The pivoting of the flaps elsewhere than at one of their side margins is obviously disadvantageous, if not impracticable, for the reason that it requires the application of great force to turn the flaps where the side margins of the same rise against the load in the act of dumping. In a wagon-body made as proposed by me the flaps, being arranged longitudinally and pivoted at their side edges, will freely open as soon as released and allow the contents of the wagon-body to be discharged on the ground beneath the wagon. The wagon can be easily driven from or over the piles of dumped material, for the reason that the longitudinal flaps are adapted to be moved endwise past the said piles of material without bringing any great strain upon the flaps, tending to injure them or retard the wagon, and without disturbing or scattering the piles. My improved construction is of especial advantage in cases where the flaps are made deep or wide, so as to reach nearly to the ground, as I propose to commonly construct them, in order to lessen the number of parts and render the structure more simple and cheap.

I claim as my invention—

1. A dump cart or wagon body provided in its bottom with longitudinally-arranged flaps extending from end to end of the body and hinged to the body at their side edges, and with a transversely-arranged axle passing through the sides of the wagon-body at a point between the ends of the latter over and free from the flaps.

2. A dump cart or wagon body provided with a central longitudinal beam or support extending from front to rear of the wagon-bed, and flaps hinged to said central beam and to the sides of the body, and a horizontal axle passing through the wagon-body above the flaps and attached to the said beam, substantially as described.

3. The combination, with the body of a dump-cart provided with longitudinally-arranged hinged flaps in its bottom extending from end to end of the body, of a transversely-arranged axle passing horizontally through said body at a point between its ends and above the flaps, and a centrally-arranged tongue extending through the front wall of the body and attached to the axle at the middle of the latter, substantially as described.

4. The combination, with the body of a dump-cart and an axle passing through the said body, of a tongue extending into the body and attached to the axle at its rear end, a longitudinal beam located beneath the axle and extending from end to end of the body, said beam being secured to the axle, substantially as described.

5. The combination, with the body of a dump-cart and an axle passing horizontally through said body, of a tongue extending into the body and attached to the axle, a longitudinal beam located beneath the axle and extending from end to end of the body, said beam being secured to the axle, and flaps hinged to the central beam and to the sides of the body and extending beneath the axle, substantially as described.

6. The combination, with the wheels and axle, of a dump-cart body comprising side walls sustained upon the said axle and extending below the latter, front and rear end walls connected with said side walls, a central longitudinal beam attached at its ends to the end walls of the body and secured to said axle, and flaps hinged to the said side walls and to the said longitudinal beam beneath the axle and forming the bottom of the body, substantially as described.

7. The combination, with a cart or wagon body and longitudinally-arranged hinged flaps forming the bottom of said body, of a rock-shaft mounted transversely at the front end of the body and provided with rigid arms, lifting-chains attached to said arms and extending downwardly to the front ends of the flaps, other lifting-chains extending from said arms to the rear ends of said flaps, and guides or pulleys upon the sides of the body near the rear end of the latter for said chains last mentioned, substantially as described.

8. The combination, with a cart or wagon body provided with hinged flaps forming the bottom thereof, and lifting-chains attached to said flaps, of a transverse rock-shaft having bearings upon the sides of the body, said rock-shaft consisting of a square bar of iron having cylindric bearings formed thereon, cast-metal arms provided with square apertures for the passage of the rock-shaft, and with set-screws for securing said arms upon the shaft, said arms consisting of two parallel parts or prongs, and having a pin extending through the extremities of said arms for the attachment of said lifting-chains, and a hand-lever attached to said shaft, substantially as described.

9. The combination, with the body of a cart or wagon provided with an outwardly-opening tail-board hinged at its top edge to the body, of longitudinal flaps hinged to the body, said flaps being provided with prongs or fingers adapted to engage the tail-board, and means for lifting and holding closed the said flaps, substantially as described.

10. The combination, with the body of a cart or wagon provided with an outwardly-opening tail-board hinged at its top edge to the body, of longitudinal flaps hinged to the body and provided with prongs or fingers adapted to engage the tail-board, the edges of the side-boards of said body being outwardly or rearwardly inclined in their parts against which the tail-board rests, whereby the said tail-board will close tight against the side-boards by gravity, substantially as described.

11. The combination, with the body of a cart or wagon and longitudinally-arranged hinged flaps, of lifting-chains extending from the front end of the wagon to each of said flaps, other lifting-chains extending from the rear ends of the alternate flaps, and prongs or fingers upon the rear ends of said flaps, to which the said chains last mentioned are connected, said fingers being adapted to extend beneath the free edges of the adjacent flaps, substantially as described.

12. The combination, with a cart or wagon body, two flaps hinged at the center of said body, and two other flaps hinged at the sides of the body, of a rock-shaft mounted at the front end of the body, lifting-chains extending from said shaft to the forward ends of all of said flaps, other lifting-chains extending from the said rock-shaft to the rear ends of the outer flaps, guides upon the sides of the body for said chains last mentioned, and prongs or fingers upon said outer flaps engaging and supporting the free edges of the inner flaps, substantially as described.

13. The combination, with a cart or wagon body provided with a central longitudinal beam, of flaps hinged to said beam, and hinges for the flaps consisting of straps secured against opposite faces of said beam, a pivot-pin inserted and held in the lower bend of the strap, and straps attached to the opposite flaps and engaging opposite ends of said pin, substantially as described.

14. The combination, with the body of a cart or wagon and an axle passing through said body, of metal shells or thimbles embracing the axle and attached to the sides of the body, said shells or thimbles forming recesses to receive the wheel-hubs, whereby the wheels may be placed close to the body.

15. The combination, with the body of a cart or wagon and an axle passing through said body, of metal shells or thimbles embracing the axle and attached to the sides of the body, said shell or thimbles consisting of two separable flanged parts, substantially as described.

In testimony that I claim the foregoing as my invention I affix my signature in presence of two witnesses.

ALEXANDER M. WOOLFOLK.

Witnesses:
C. CLARENCE POOLE,
O. N. WILLIS.